United States Patent
Treutler et al.

(10) Patent No.: US 6,240,777 B1
(45) Date of Patent: *Jun. 5, 2001

(54) SENSOR HAVING A MEMBRANE

(75) Inventors: Christoph Treutler, Wannweil; Herbert Goebel, Reutlingen; Heribert Weber, Nuertingen; Wolfgang Mueller, Stuttgart; Steffen Schmidt; Klaus Heyers, both of Reutlingen; Hans-Friedemann Kober, Tuebingen; Werner Steiner, Boeblingen, all of (DE)

(73) Assignee: Robert Bosch GmbH, Stuttgart (DE)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/168,394

(22) Filed: Oct. 6, 1998

(30) Foreign Application Priority Data

Oct. 7, 1997 (DE) .............................. 197 44 228

(51) Int. Cl.⁷ .................................................. G01F 1/68
(52) U.S. Cl. .................... 73/204.26; 73/204.11
(58) Field of Search ............................. 73/204.26, 204.11

(56) References Cited

U.S. PATENT DOCUMENTS

| 5,393,351 | * | 2/1995 | Kinard et al. | 136/225 |
| 5,428,244 | * | 6/1995 | Segawa et al. | 257/646 |
| 5,627,403 | * | 5/1997 | Bacchetta et al. | 257/639 |
| 5,659,127 | * | 8/1997 | Shie et al. | 73/31.05 |
| 5,804,462 | * | 9/1998 | Liu et al. | 438/53 |
| 5,815,223 | * | 9/1998 | Watanabe et al. | 349/42 |

FOREIGN PATENT DOCUMENTS 37 11 511    6/1988 (DE) .

* cited by examiner

Primary Examiner—Harshad Patel
(74) Attorney, Agent, or Firm—Kenyon & Kenyon

(57) ABSTRACT

A sensor has a membrane, on which at least one resistor element is situated. The membrane has a membrane layer which is composed of a plurality of partial layers. In addition, a covering layer is provided which is composed of a plurality of partial layers. The partial layers of the membrane and the covering layer are selected so that both in the membrane and in the covering layer light tensile stresses are set, the tensile stresses preferably being roughly the same.

20 Claims, 1 Drawing Sheet

SENSOR HAVING A MEMBRANE

BACKGROUND INFORMATION

International Patent Publication No. WO 89/05963 describes a mass flow sensor having a membrane. The membrane is composed of a multiplicity of dielectric layers. On the membrane, thin-film resistor elements are arranged which are used to heat the membrane and to measure the temperature of the membrane. The membrane is composed of a plurality of layers which are selected with regard to their thermal expansion coefficients such that slight tensile stresses relative to the silicon frame are enabled to be set. On the upper side of the membrane and of the resistor elements, a covering layer is applied, also made of a dielectric material.

SUMMARY OF THE INVENTION

A sensor according to the present invention has the advantage that, as a result of a covering layer which also has slight tensile stresses in itself, the stability of the membrane is improved.

As a result of the multi-layer construction of the covering layer, the possibilities for adjusting the stress conditions in the covering layer are improved. Furthermore, because of the multi-layer design, the standards of the covering layer, in particular concerning its adhesion and the seal tightness, can be raised. Through the use of a first partial layer, having a certain silicon residue, particularly good adhesion to the resistor elements, made from a thin film, can be attained. Through a stoichiometric silicon layer, applied thereon, particularly good protection against humidity is achieved. Moreover, a first partial layer of silicon oxide and on top of that a second partial layer of silicon oxide, silicon nitride or a combination having tensile stresses can be used. It is also advantageous to provide a symmetrical construction, in which the tensile stress of the membrane is roughly equal to the tensile stresses in the covering layer, since in this way a stress gradient in the individual layers is reduced and a rupture of the layers is prevented. The layers can also seamlessly pass over into each other.

DETAILED DESCRIPTION

Figure 1:
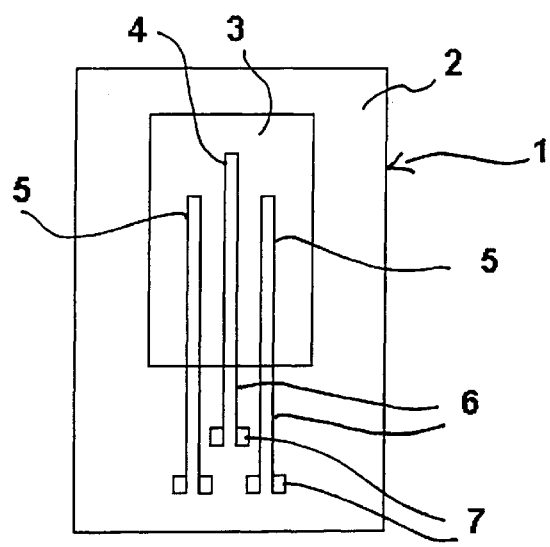
FIG. 1 shows a top view of a sensor having a membrane.
Figure 2:
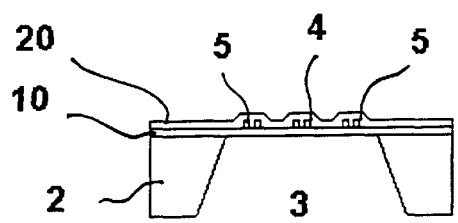
FIG. 2 shows a cross section of the sensor illustrated in FIG. 1.

FIG. 1 shows a top view of a mass flow sensor, and FIG. 2 shows a cross section of mass flow sensor 1. Mass flow sensor 1 has a frame 2 made of monocrystalline silicon, in which a membrane 3 is mounted (or fixed). Arranged on membrane 3 are a heater 4 and, on both sides of heater 4, a temperature measuring element 5, respectively. Heater 4 and temperature measuring elements 5 are connected to interconnecting areas 7 via printed circuit traces 6. As can be seen in FIG. 2, membrane 3 is formed from a membrane layer 10, on which heater 4 and temperature measuring elements 5 are then arranged. The upper sides of membrane layer 10, the heater 4, and temperature measuring elements 5 are covered by a covering layer 20.

As a rule, monocrystalline silicon is used for silicon frame 2. Frame 2 is formed by a monocrystalline silicon plate being etched using an anisotropic etching process. In this way, the characteristic canted side walls are formed, which are schematically shown in FIG. 2. This etching step takes place at any stage in the process after membrane layer 10 is applied, preferably as the last process step. After membrane layer 10 is deposited on the silicon substrate, the thin layers for heater 4 and temperature measuring elements 5 are then applied. Typically, these are thin layers of metal, for example, platinum or the like. Through patterning, resistor elements forming heater 4 and temperature measuring elements 5 are then delineated out of the metal layer. In addition, printed circuit traces 6 and interconnecting regions 7 are delineated out of the thin-film layers. In a further process step, a covering layer 20 is then applied.

Membrane 3 is heated by an electrical current that is sent through the resistor element of heater 4. As an air current flows past, membrane 3 is cooled as a function of the intensity of the flow. The electrical resistance through the resistor element of temperature measuring element 5 is a function of the temperature. By measuring the resistance of temperature measuring element 5, the amount of cooling that membrane 3 is subjected to can be measured, and, as a result, the intensity of the current flowing past can be calculated.

In order to assure long durability of the sensor, the stress conditions within membrane 3 must be controlled. Because of the strong temperature stresses of the membrane, the thermal expansion coefficients of the materials used must be taken into account. For membrane layer 10 and covering layer 20, dielectric materials are generally used, and for resistor elements 4,5, metals are generally used. These materials differ significantly in their thermal expansion coefficients from the silicon of frame 2. International Patent Publication No. WO 89/05963 describes how to construct membrane layer 10 out of two partial layers, of which one has a thermal expansion coefficient that is greater than that of silicon (silicon nitride) and one material has a thermal expansion coefficient that is smaller than that of silicon (silicon oxide). As a result of this two-part design, the thermal expansion coefficient of membrane layer 10 can be adjusted to the thermal expansion coefficient of the silicon frame. In this context, however, the covering layer 20 is not taken into account.

Figure 3:
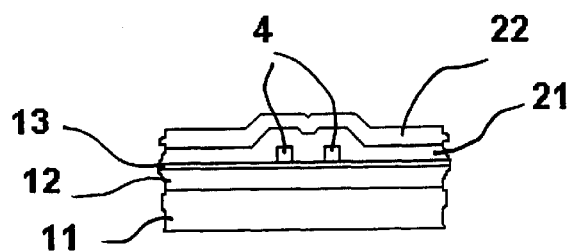
FIG. 3 shows an application of layers for the membrane and covering layers.

FIG. 3 shows a cross section of the structure, according to the present invention, of membrane 3 in the vicinity of heater 4. Membrane layer 10 here is made of three partial layers, in particular, a first silicon oxide layer 11, a silicon nitride layer 12, applied thereon, and a second silicon oxide layer 13 applied to silicon nitride layer 12. First silicon oxide layer 11 is produced in a conventional process, in particular, thermal oxidation of silicon or depositing of silicon oxide layers. On this layer, a silicon nitride layer 12 was produced using the conventional process of depositing layers of this type (chemical deposition process or plasma-supported chemical deposition process). Second silicon oxide layer 13, applied on silicon nitride layer 12, is formed through reoxidation, i.e., through transformation of a thin superficial layer of the silicon nitride layer 12. This takes place at high temperatures by applying water vapor or oxygen to the silicon nitride surface. The advantage of this reoxidized silicon oxide layer 13 can be seen in that it has excellent adhesion to the silicon nitride layer underneath, and the adhesion of metal films applied thereon, from which the resistor element of heater 4 is then formed, is significantly improved. Layers 11, 12, 13 are designed with respect to their thickness and their inner stress conditions such that for membrane layer 10 as a whole a slight tensile stress relative to the silicon of frame 2 results. After the resistor elements are applied and delineated out, a two-layer covering layer, having a first covering layer 21 and a further covering layer 22, is then applied. First covering layer 21 is essentially made of silicon oxide, since this material has excellent adhesion both to reoxidized silicon nitride layer 13 as well as to the metal of resistor elements 4,5 and printed circuit traces 6. A second covering layer 22 is then formed on first covering layer 21 made of silicon oxide.

Both layers 21 and 22 are designed with regard to their thermal expansion coefficients such that a slight tensile stress relative to the silicon of frame 2 results. In this context, it is particularly advantageous if the slight tensile stresses in covering layer 20 correspond exactly to the tensile stresses in membrane layer 10. However, the latter tensile stresses, given the manufacturing tolerances, will never be able to be achieved 100%. Nevertheless, it is extremely desirable for the tensile stresses in covering layer 20 to be roughly as large as the tensile stresses in membrane layer 10. As a result of the configuration of covering layer 20, which also results in slight tensile stresses, it is assured that mechanical strains within membrane 3 will be slight. Thus it is achieved that covering layer 20 adheres particularly well to membrane layer 10 or resistor elements 4,5. In addition, mechanical stresses do not act upon resistor elements 4,5 thus also improving their adhesion to membrane layer 10. Furthermore, the electrical resistance within the resistor elements is also a function of the mechanical stress conditions in the resistor layer, so that by adjusting the slight tensile stresses in the covering layer, control of the resistance value of resistor elements 4,5 is also improved. Moreover, it is known that stress conditions promote the inwards diffusion of contaminants into metals. This effect is also prevented or reduced by the present invention.

Available again as materials for first and second covering layer 21,22, are basically silicon nitride and silicon oxide. For example, one possible sequence of layers can be to form first covering layer 21 with a silicon oxide layer having a light silicon residue. Silicon layers of this type have tensile stresses and, due to the silicon residue, exhibit superior adhesion to metallic layers. Furthermore, it has been shown that a light silicon residue in a first covering layer 21 of this type has a positive influence on the long-term stability of the resistance coefficients of metallic resistor elements, in particular of metallic resistor elements made of platinum. In order to compensate for the tensile stresses of this first covering layer 21 made of silicon oxide having a light silicon residue, a stoichiometric silicon oxide layer is then deposited for second covering layer 22. A stoichiometric silicon oxide layer of this type exhibits compressive stresses. The thicknesses of the layers are selected here such that, altogether, for covering layer 20, which is formed from first covering layer 21 and second covering layer 22, light tensile stresses result. Stoichiometric silicon oxide layers have additionally proven to be particularly resistant to humidity, so that, as a result of this two-layer covering layer, not only can the stress condition be set, as desired, at slight tensile stresses, but also superior insulation from humidity is achieved. In another embodiment for covering layer 20 according to the present invention, a silicon oxide layer, for example a stoichiometric silicon oxide layer having compressive stresses, is deposited for first covering layer 21. A second covering layer 22 having tensile stresses is then deposited onto a first covering layer 21 of this type made of silicon oxide having compressive stresses. In this case, silicon nitride, silicon oxide having tensile stresses or a combination of these two materials is suitable for second covering layer 22. Silicon nitride has also proven itself to be very resistant to humidity and is thus also suitable for assuring the long-term stability of the resistor elements.

Figure 4:
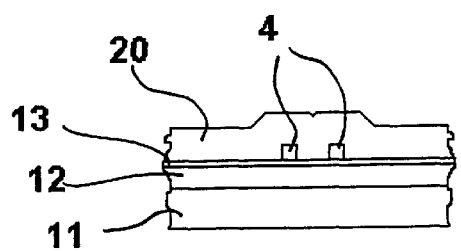
FIG. 4 shows an application of covering layers.

FIG. 4 shows another embodiment of the present invention having a one-layer covering layer 20. Reference numerals 11, 12, and 13 designate the same elements in FIG. 4 as in FIG. 3. One-layer covering layer 20 is configured so that it has slight tensile stresses and nevertheless adheres well to reoxidized layer 13 and metal 4. In addition, the composition of the layer is continually changed. Layer 20 made of silicon oxide having an increased silicon percentage acts as a substrate of layer 13 and 4 so that tensile stresses are created. As the thickness increases, the silicon residue is continually altered in the direction of a stoichiometric silicon oxide layer, so that compressive stresses are created. The gradient of the stress condition can be realized through the appropriate alteration of the plasma parameters during deposition.

What is claimed is:

1. A sensor comprising:
   a silicon frame;
   a membrane situated in the silicon frame and exhibiting a light tensile stress relative to the silicon frame, the membrane including a plurality of dielectric layers;
   at least one resistor element composed of a metallic thin film and applied on the membrane; and
   a covering layer for covering the at least one resistor element and an upper side of the membrane, the covering layer exhibiting another light tensile stress relative to the silicon frame;
   wherein the membrane and the covering layer each include at least two layers, the at least two layers including a material having a tensile stress and another material having a compressive stress relative to the silicon frame.

2. The sensor according to claim 1, wherein:
   the covering layer includes a first layer and a second layer;
   the first layer is composed of a silicon oxide compound;
   the first layer is applied on the at least one resistor element and on the upper side of the membrane;
   the second layer is applied on the first layer; and
   each of the first and second layers exhibits stresses for providing the another light tensile stress.

3. The sensor according to claim 2, wherein in the covering layer:
   the first layer includes silicon oxide having a light silicon residue and exhibiting tensile stresses; and
   the second layer includes a stoichiometric silicon oxide layer exhibiting compressive stresses.

4. The sensor according to claim 2, wherein in the covering layer:
   the first layer exhibits compressive stresses; and
   the second layer exhibits tensile stresses and is composed of one of a silicon oxide compound, a silicon nitride compound and a combination of the silicon oxide and silicon nitride compounds.

5. The sensor according to claim 1, wherein the light tensile stress of the membrane and the another light tensile stress are approximately the same.

6. The sensor according to claim 1, wherein the covering layer is composed of a silicon oxide compound, the silicon oxide compound having a silicon residue which continually changes as a function of a thickness of the covering layer to provide the at least two layers including the material having the tensile stress and the another material having the compressive stress relative to the silicon frame for the covering layer.

7. The sensor according to claim 6, wherein an amount of the silicon residue is largest at a surface of the covering layer which borders the at least one resistor element and a surface of the membrane.

8. The sensor according to claim 1, wherein the sensor is a mass flow sensor.

9. The sensor according to claim 1, wherein the at least one resistor element includes a heater element and a temperature measuring element.

10. The sensor according to claim 1, wherein the membrane includes a first layer of silicon oxide, a layer of silicon nitride and a second layer of silicon oxide, the layer of silicon nitride being between the first layer of silicon oxide and the second layer of silicon oxide.

11. The sensor according to claim 10, wherein in the membrane:
the first layer of silicon oxide is formed by one of thermally oxidizing silicon and depositing silicon; and
the second layer of silicon oxide is formed by reoxidizing a surface layer of the layer of silicon nitride.

12. The sensor according to claim 1, wherein the covering layer includes a first layer on the membrane, the first layer including silicon oxide.

13. The sensor according to claim 12, wherein the covering layer includes a second layer on the first layer, the second layer being a stoichiometric silicon oxide layer.

14. The sensor according to claim 1, wherein the covering layer includes a first layer on the membrane, the first layer being a stoichiometric silicon oxide layer.

15. The sensor according to claim 14, wherein the covering layer includes a second layer on the first layer, the second layer including at least one of a silicon nitride and a silicon oxide having tensile stresses.

16. A sensor for use as a mass flow sensor, the sensor comprising:
a frame including monocrystalline silicon;
a membrane situated in the silicon frame and exhibiting a light tensile stress relative to the frame, the membrane including a plurality of dielectric layers;
at least one resistor element composed of a metallic thin film and applied on the membrane; and
a covering layer for covering the at least one resistor element and an upper side of the membrane, the covering layer exhibiting another light tensile stress relative to the frame, wherein:
the covering layer includes one layer of a stoichiometric silicon oxide and another layer including at least one of a silicon nitride and a silicon oxide having tensile stresses; and
the another light tensile stress is approximately the same as the light tensile stress of the membrane;
wherein the membrane and the covering layer each include at least two layers, the at least two layers including a material having a tensile stress and another material having a compressive stress relative to the silicon frame.

17. The sensor according to claim 16, wherein the at least one resistor element includes a heater element and a temperature measuring element.

18. The sensor according to claim 16, wherein the membrane includes a first layer of silicon oxide, a layer of silicon nitride and a second layer of silicon oxide, the layer of silicon nitride being between the first layer of silicon oxide and the second layer of silicon oxide.

19. The sensor according to claim 18, wherein:
the first layer of silicon oxide of the membrane is formed by one of thermally oxidizing silicon and depositing silicon; and
the second layer of silicon oxide of the membrane is formed by reoxidizing a surface layer of the layer of silicon nitride.

20. A sensor for use as a mass flow sensor, the sensor comprising:
a frame including monocrystalline silicon;
a membrane situated in the silicon frame and exhibiting a light tensile stress relative to the frame, wherein the membrane includes a first layer of silicon oxide, a layer of silicon nitride and a second layer of silicon oxide, the layer of silicon nitride being between the first layer of silicon oxide and the second layer of silicon oxide;
at least one resistor element composed of a metallic thin film and applied on the membrane, wherein the at least one resistor element includes a heater element and a temperature measuring element; and
a covering layer for covering the at least one resistor element and an upper side of the membrane, the covering layer exhibiting another light tensile stress relative to the frame, wherein:
the covering layer includes one layer of a stoichiometric silicon oxide and another layer including at least one of a silicon nitride and a silicon oxide having tensile stresses; and
the another light tensile stress is approximately the same as the light tensile stress of the membrane;
wherein the membrane and the covering layer each include at least two layers, the at least two layers including a material having a tensile stress and another material having a compressive stress relative to the silicon frame.

* * * * *